US009531951B2

(12) United States Patent
Pfeil

(10) Patent No.: US 9,531,951 B2
(45) Date of Patent: Dec. 27, 2016

(54) CAMERA SYSTEM FOR RECORDING IMAGES, AND ASSOCIATED METHOD

(75) Inventor: Jonas Pfeil, Berlin (DE)

(73) Assignee: PANONO GMBH, Berlin (DE)

( * ) Notice: Subject to any disclaimer, the term of this patent is extended or adjusted under 35 U.S.C. 154(b) by 295 days.

(21) Appl. No.: 14/113,924

(22) PCT Filed: Apr. 30, 2012

(86) PCT No.: PCT/DE2012/000464
§ 371 (c)(1),
(2), (4) Date: Jan. 2, 2014

(87) PCT Pub. No.: WO2012/149926
PCT Pub. Date: Nov. 8, 2012

(65) Prior Publication Data
US 2014/0111608 A1    Apr. 24, 2014

(30) Foreign Application Priority Data

May 5, 2011 (DE) .................. 10 2011 100 738
Aug. 8, 2011 (DE) .................. 10 2011 109 990

(51) Int. Cl.
*H04N 5/232* (2006.01)
*H04N 5/247* (2006.01)
*H04N 5/225* (2006.01)

(52) U.S. Cl.
CPC ...... *H04N 5/23238* (2013.01); *H04N 5/23258* (2013.01); *H04N 5/23264* (2013.01); *H04N 5/247* (2013.01); *H04N 5/2252* (2013.01)

(58) Field of Classification Search
CPC .. H04N 5/23238; H04N 5/247; H04N 5/2252; H04N 5/23258; H04N 5/23264
(Continued)

(56) References Cited

U.S. PATENT DOCUMENTS 3,046,792 A    7/1962  Morgan
3,505,465 A    4/1970  Rees
(Continued)

FOREIGN PATENT DOCUMENTS

GB         2407725 A  *  5/2005  ......... A63B 24/0003
GB   WO 2008090345 A1 *  7/2008  ........... H04N 5/2252
(Continued)

OTHER PUBLICATIONS

Written Opinion for PCT Application No. DE201200464 (published as WO2012149926).*
(Continued)

*Primary Examiner* — Christopher S Kelley
*Assistant Examiner* — Kathleen Walsh
(74) *Attorney, Agent, or Firm* — Medler Ferro Woodhouse & Mills PLLC

(57) ABSTRACT

In the case of a camera system for recording images consisting of at least one single camera, a solution is intended to be provided which allows a good sharp image to be recorded. This is achieved by virtue of the single cameras (1) each being arranged in different directions such that they record a continuous overall image, with the overall image comprising the frames from the single cameras (1), and are being a central control unit (3) which can be used to capture the motion profile of the camera system by means of at least one sensor (2) and to ascertain the trigger times of the single cameras (1) on the basis of a prescribed target function, said camera system moving autonomously over the entire time progression.

18 Claims, 1 Drawing Sheet

(58) Field of Classification Search
USPC .................................................. 348/36, 37
See application file for complete search history.

(56) References Cited

U.S. PATENT DOCUMENTS

| | | | |
|---|---|---|---|
| 5,023,725 A | 6/1991 | McCutchen | |
| 5,099,694 A * | 3/1992 | Sumio | G01P 7/00 |
| | | | 348/E5.046 |
| 5,864,360 A | 1/1999 | Okauchi | |
| 6,192,196 B1 | 2/2001 | Keller | |
| 6,466,254 B1 * | 10/2002 | Furlan | H04N 5/2259 |
| | | | 348/36 |
| 6,947,059 B2 * | 9/2005 | Pierce | H04N 5/23238 |
| | | | 345/629 |
| 7,463,280 B2 * | 12/2008 | Steuart, III | G03B 35/08 |
| | | | 348/36 |
| 2008/0143842 A1 | 6/2008 | Gillard | |
| 2008/0316462 A1 | 12/2008 | Riel | |
| 2009/0207246 A1 | 8/2009 | Inami | |
| 2010/0277617 A1 * | 11/2010 | Hollinger | H04N 5/2252 |
| | | | 348/231.99 |
| 2011/0142370 A1 * | 6/2011 | Joshi | G06T 3/4038 |
| | | | 382/307 |
| 2011/0157305 A1 | 6/2011 | Kosakai | |
| 2011/0164137 A1 * | 7/2011 | Schwartz | G08B 13/19621 |
| | | | 348/159 |
| 2012/0139727 A1 | 6/2012 | Houvener | |
| 2013/0210563 A1 | 8/2013 | Hollinger | |

FOREIGN PATENT DOCUMENTS

| | | |
|---|---|---|
| JP | 2001 320736 | 11/2001 |
| WO | WO 2014/066405 | 5/2014 |

OTHER PUBLICATIONS

Office Action dated Feb. 2, 2016, for co-pending U.S. Appl. No. 14/064,666.
Co-pending U.S. Appl. No. 14/064,666, filed Oct. 28, 2013, Jonas Pfeil.
Office Action dated Sep. 9, 2016, for co-pending U.S. Appl. No. 14/064,666.

* cited by examiner

CAMERA SYSTEM FOR RECORDING IMAGES, AND ASSOCIATED METHOD

This application is a National Stage of PCT/DE2012/000464, filed Apr. 30, 2012, which claims priority to German Patent Application No, 10 2011 109 990.9, filed Aug. 8, 2011 and German Patent Application No. 10 2011 100 738.9, filed May 5, 2011, the disclosures of each of which are incorporated herein by reference in their entireties.

The invention is directed to a camera system of capturing images consisting of at least a single camera.

The invention is further directed to a method of capturing images using a camera system comprising at least a single camera and at least a control unit, and a sensor, in particular an accelerometer.

Panoramic images allow us to capture images that come close to the human visual field. They thus enable a better overall impression of a place than images of normal cameras. Panoramic cameras allow capturing such panoramic views by using a single camera or several single cameras. The images of several single cameras can be later assembled into a seamlessly composite image.

For cylindrical panoramas, special cameras exist that can project the scenery on an analog film or digital imaging sensor. Incomplete spherical panoramas can be imaged by photographing a suitably shaped mirror (e.g. ball) and distortion can subsequently be corrected. U.S. Pat. No. 3,505,465 describes a catadioptric video camera that enables a 360° panoramic view.

Fully spherical panoramas can be created by capturing single images and subsequently assembling them (automatically) by a computer. Thereby, the images can be captured either simultaneously by multiple cameras or sequentially with a single camera.

A single camera can be rotated to take overlapping images that can be assembled later. This principle works with a normal lens, fish-eye lenses and catadioptric systems.

In order to circumvent problems caused by time shifted image capturings of a single camera, multiple cameras can be mounted to cover the full solid angle of 4 pi (Π) sr. In this case the visual field of the cameras overlap and allow a later assembly of individual images.

In U.S. Pat. No. 7,463,280 an omnidirectional 3-D camera system is described which is composed of several single cameras. U.S. Pat. No. 6,947,059 describes a stereoscopic omnidirectional camera system composed of multiple single cameras. U.S. Pat. No. 5,023,725 discloses an omnidirectional camera system in which the single cameras are arranged as a dodecahedron.

The term "camera tossing" describes throwing normal cameras using a timer with preset delay for taking a photograph during flight. Several design studies for panoramic cameras exist, as well as for single cameras that are thrown or shot into the air.

"Triops" is the concept of a ball with three fish-eye lenses. The "CTRUS" football is supposed to integrate cameras into the surface of a football. The "I-Ball" design consists of two fish-eye lenses integrated into a ball to be thrown or shot in the air.

In the prior art, there are single cameras to be tossed in the air. "Flee" is a ball with a tail feather. "SatuGO" is a similar concept without a tail feather.

It has not been described so far how to obtain a good sharp image with these cameras that are tossed in the air.

The objective of this invention is to provide a solution that enables each single camera to capture a good and sharp image, wherein the images can then assembled to an omnidirectional panoramic image. The solution is provided through a system of integrated cameras.

The present invention solves the problem by the features of the independent claims 1 through 15. Advantageous embodiments are described in the dependent claims.

The present invention solves the problem by providing the aforementioned camera system, wherein single cameras are each oriented into different directions so that they capture a composite image without gaps, wherein the composite image comprises single images of the single cameras, and wherein a central control unit is arranged, which enables registering a motion profile of the camera system by at least one sensor and determining the moment of triggering the single cameras according to a predetermined objective function, wherein the camera system moves autonomously over the entire time span. Such a camera system enables an autonomous triggering of the single cameras according to an objective function using a panoramic camera, e.g. when it is thrown into the air.

In one embodiment of the invention, the sensor is an accelerometer. This enables measuring the acceleration during throwing of a panoramic camera into the air and to using the acceleration to determine the moment of triggering the single cameras according to an objective function.

In another embodiment of the invention, the sensor is a sensor for measuring the velocity relative to the ambient air. Thus, image captures can be triggered according to an objective function which depends directly on the actual measured velocity of the camera system.

To trigger the camera system at a predetermined position it is advantageous that the objective function determines triggering the single cameras when the camera system falls short of a minimum distance d from the trigger point within the motion profile; an aspect the present invention further provides for.

In one embodiment of the invention, the camera system is preferably triggered at the apogee of a trajectory. At the apogee, the velocity of the camera system is 0 m/s. The closer the camera system triggers at this point, the slower it moves, resulting in less motion blur on the captured image.

The apogee also provides an interesting perspective, a good overview of the scenery and reduces parallax error due to smaller relative distance differences e.g. between ground and thrower.

In a further embodiment of the invention, the minimum distance d is at most 20 cm, preferably 5 cm, in particular 1 cm. If the trigger point is the apogee within a trajectory, it is advantageous that the camera system triggers as close to the point of momentary suspension as possible.

In one embodiment of the invention, the single cameras are preferably arranged that they cover a solid angle of 4 pi sr. Thus the camera system is omnidirectional and its orientation is irrelevant at the moment of image capture. Handling of the camera system is therefore easier compared with only a partial coverage of the solid angle, because the orientation is not important. In addition, the full spherical panorama allows viewing the scenery in every direction.

In another embodiment of the invention, the camera system comprises a supporting structure, and recesses in which the single cameras are arranged, wherein the recesses are designed so that a finger contact with camera lenses is unlikely to occur or impossible, wherein a padding may be attached to the exterior of the camera system. Lens pollution or damage is prevented by the recessed single cameras. Padding can both prevent the damage of the single cameras as well as the damage of the camera system as a whole. The padding can form an integral part of the supporting structure.

For example, the use of a very soft material for the supporting structure of the camera system is conceivable. The padding may ensure that touching the camera lens with fingers is made difficult or impossible. A small aperture angle of the single cameras is advantageous allowing the recesses in which the single cameras are located to be narrower. However, more single cameras are needed to cover the same solid angle in comparison to single cameras with a larger aperture angle.

In yet another embodiment of the invention, the camera system is characterized in that at least 80%, preferably more than 90%, in particular 100% of the surface of the camera system form light inlets for the single cameras. When images of several single cameras are assembled ("stitching") into a composite image, parallax error is caused due to different centers of projection of the single cameras. This can only fee completely avoided if the projection centers of all single cameras are located at the same point. However, for a solid angle covering 4 pi sr it can only be accomplished, if the entire surface of the camera system is used for collecting light beams. This is the case for a "glass sphere". Deviations from this principle result in a loss of light beams which pass through the surface aligning with the desired common projection center. Thus parallax errors occur. Parallax errors can be kept as small as possible, if the largest possible part of the surface of the camera system is composed of light inlets for the single cameras.

In order to align the horizon when looking at the composite image, it is expedient to determine the direction of the gravity vector relative to the camera system at the moment of image capture. Since the camera system is in free fall with air resistance during image capture, the gravity vector cannot be determined or can very difficult be determined accurately with an accelerometer. Therefore, the described camera system may apply a method in which the gravity vector is determined with an accelerometer or another orientation sensor such as a magnetic field sensor before the camera system is in flight phase. The accelerometer or orientation sensor is preferably working in a 3-axis mode.

The change in orientation between the moment in which the gravity vector is determined and the moment in which an image is captured can be determined using a rotation rate sensor, or another sensor that measures the rotation of the camera system. The gravity vector in relation to the camera system at the moment of image capture can be easily calculated if the change in orientation is known. With a sufficiently accurate and high resolution accelerometer it may also be possible to determine the gravity vector at the moment of image capture with sufficient accuracy for viewing the composite image based on the acceleration influenced by air friction and determined by the accelerometer, provided that the trajectory is almost vertical.

In a further embodiment of the invention, the camera system comprises at least one rotation rate sensor, wherein the central control unit prevents triggering of the single cameras if the camera system exceeds a certain rotation rate r, wherein the rotation rate r is calculable from the desired maximum blur and used exposure time, in little illuminated sceneries or less sensitive single cameras, it may be useful to pass the camera system several times into the air (eg, to throw) and only trigger in case the system does not spin strongly. The maximum rotation rate to avoid a certain motion blur can be calculated by the exposure time applied. The tolerated blur can be set and the camera system can be passed several times into the air until one remains below the calculated rotation rate. A (ball-shaped) camera system can easily be thrown into the air repeatedly, which increases the chance of a sharp image over a single toss.

At first, the luminance in the different directions must be measured for setting the exposure. Either dedicated light sensors (such as photodiodes) or the single cameras themselves can be used. These dedicated exposure sensors that are installed in the camera system in addition to the single cameras should cover the largest possible solid angle, ideally the solid angle of 4 pi sr. If the single cameras are used, one option is to use the built-in system of the single cameras for determining exposure and transferring the results (for example in the form of exposure time and/or aperture) to the control unit. Another option is to take a series of exposures with the single cameras (e.g. different exposure times with the same aperture) and to transfer these images to the control unit. The control unit can determine the luminance from different directions based on the transferred data and calculate exposure values for the single cameras. For example, a uniform global exposure may be aimed at or different exposure values for different directions may be used. Different exposure values can be useful to avoid local over- or underexposure. A gradual transition between light and dark exposure can be sought based on the collected exposure data.

Once the exposure values are calculated (exposure time and/or aperture, depending on the single cameras used), they are transmitted to the single cameras. The measurement of the exposure and the triggering of the single camera for the actual photo can be done either during the same flight or in successive flights. If the measurement of the exposure and triggering for the actual photo is made in different flights, it may be necessary to measure the rotation of the camera between these events and to adjust the exposure values accordingly, in order to trigger with a correct exposure in the correct direction.

Furthermore, the above problem is solved through a method of capturing images using a camera system of the type described above. The invention therefore also provides a method characterized in that the moment of triggering for the single cameras is determined by integrating the acceleration in time before entry into free fall with air resistance, and that the triggering of the single cameras occur after falling short from a minimum distance to the trigger point within the trajectory, or upon detection of the free fall with air resistance, or upon a change of the direction of the air resistance at the transition from the rise to the descent profile, or upon drop of the relative velocity to the ambient air below at least 2 m/s, preferably below 1 m/s, in particular below 0.5 m/s, wherein either an image comprising at least a single image is captured by the single cameras or a time series of images each comprising at least one single image is captured by the single cameras, and the control unit evaluates the images in dependence on the content of the images and only one image is selected.

The state of fee fall with air resistance of a camera system transferred into the air (tossed, shot, thrown, etc.) occurs when no external force is applied apart from gravity and air resistance. This applies to a thrown system as soon as the system has left the hand. In this state, an accelerometer will only detect acceleration due to air resistance alone. Therefore, it is appropriate to use the acceleration measured before the beginning of the free fall in order to determine the trajectory. By integrating this acceleration, the initial velocity of flight and the ascending time to a trigger point can be calculated. The triggering can then be performed after expiration of the ascending time.

Another possibility is to evaluate the acceleration measured during ascent and descent due to air resistance. The acceleration vector depends on the actual velocity and direction of flight. The current position in the trajectory can be concluded from evaluating the time course of the acceleration vector. For example, one can thereby realize triggering at the apogee of a flight.

The actual position in the trajectory can also be concluded from measuring the relative velocity to the ambient air directly; and the camera system can trigger e.g. if it falls short of a certain velocity.

When triggered, the camera system can capture either a single image (consisting of the individual images of the single cameras), or a series of images, for example, captured in uniform time intervals.

In this context it may also be useful to start triggering a series of image capture events directly after detecting free fall with air resistance, for example by an accelerometer.

In one embodiment of the invention the image is selected from the time series of images by calculating the current position of the camera system from the images, or by the sharpness of the images, or by the size of the compressed images.

By analyzing the image data of a series of images, it is possible to calculate the motion profile of the camera system. This can be used to select an image from the series of images. For example, the image captured when the camera system was closest to the apogee of the flight can be selected.

According to the invention it is particularly useful that the single cameras are synchronized with each other so that they all trigger at the same time. The synchronization ensures that the single images match both locally and temporally.

To produce good and sharp images single cameras with integrated image stabilization can be used in the camera system. These can work for example with motile piezo-driven image sensors. For cost savings and/or lower energy consumption it may be expedient to use the sensors connected to the control unit, in particular the rotation rate sensors, for determining control signals for image stabilization systems of the single cameras. Thus, these sensors do not have to be present in the single cameras and the single cameras can remain turned off for a longer time.

Further, the sharpness of the images can foe analyzed to directly select a picture with as little motion blur as possible. The consideration of the size of compressed images can lead to a similar result because sharper images contain more information and therefore take up more space in the data storage at the same compression rate.

According to one embodiment of the invention, once the rotational rate r is exceeded (wherein the rotational rate r can be calculated from the exposure time and the desired maximum motion blur), the triggering of the single cameras is suppressed or images are buffered from a plurality of successive flights and the control unit controls the selection of only one of these images, wherein the image is selected based on the blur calculated from the image content, or based on the measured rotational rate r, or based on the blur calculated from its measured rotational rate r and the used exposure time. Thus, a user can simply throw the system repeatedly into the air and obtains a sharp image with high probability.

To obtain a single sharp image with as little motion blur as possible by repeatedly throwing the camera system into the air, two basic approaches are possible. Either the camera system triggers only below a certain rotation rate r and indicates image capturing visually or acoustically, or images of several flights are buffered and the image with the least blur is selected from this set of images.

If triggering is suppressed when exceeding a rotational rate r, this rate of rotation can be either chosen manually or calculated. It can be calculated from a fixed or user-selected maximum motion blur and the exposure time applied. For the calculation one can consider as how many pixels would be exposed by a point light source during exposure.

In the case of buffering, the control unit decides on the end of a flight series. This decision may be made due to a temporal interval (e.g. no flight/toss over several seconds) or by user interaction, such as pressing a button. For selection of the image from the series of images several methods are possible. First, the blur caused by the rotation can be determined from the image contents using image processing and the sharpest image can be selected. Second, the measured rotational rate r can be used, and the image with the lowest rotation rate r can be selected. Third, the blur from the measured rotational rate r and applied exposure time can be calculated to select the sharpest image.

In case of exceeding the rotation rate r, another possibility is to buffer the images of several successive flights and select the sharpest image. The selection of the sharpest image can either be based on the contents of the images, or on the rotational rate measured. If it is done by the rotation rate measured, an acceptable maximum rotation rate m can be calculated using a preset upper maximum motion blur and the exposure time applied. If there is no image in a series below a preset maximum motion blur or below the upper acceptable maximum rotational rate m, it is also possible that none of the images is selected. This gives the user the opportunity to directly retry taking pictures. It is also possible to trigger image capture events in a series only when the measured rotational rate is below the maximum acceptable upper rotational rate m.

Further, it is intended to reduce the occurrence of blurred images by influencing the rotation of the camera system. To slow down and at best stop the rotation of the camera system at the apex means for detecting the self-rotation and means for compensating for the rotation of the camera system can be included. Known active and passive methods can be employed to slow down the rotation.

In the active methods the control system uses a control with or without feedback. For example, reaction wheels use three orthogonal wheels, which are accelerated from a resting position in opposite direction to the ball rotation about each of the respective axis. When using compressed air from a reservoir e.g. 4 nozzles are mounted in the form of a cross at a position outside of the ball and two further nozzles attached perpendicular to the 4 nozzles on the surface of the camera system. Electrically controllable valves and hoses connected to the nozzles are controlled by comparison with data from the rotational rate sensor.

Further, to slow down the rotation of the camera system moving weights which upon activation increase the ball's moment of inertia can be employed.

As a passive method, it would be appropriate to attach e.g. wings or tail feathers outside of the camera system as aerodynamically effective elements.

Another method employs a liquid, a granule, or a solid body, each in a container, in tubes or in a cardanic suspension. These elements would dampen the rotation due to friction.

The above mentioned and claimed and in the exemplary embodiments described components to be used in accordance to the invention are not subject to exceptions with respect to their size, shape, design, material selection and technical concepts so that selection criteria well-known in the art can be applied without restriction.

Further details, features and advantages of the invention's object emerge from the dependent claims and from the following description of the accompanying drawings in which a preferred embodiment of the invention is presented.

Figure 1:
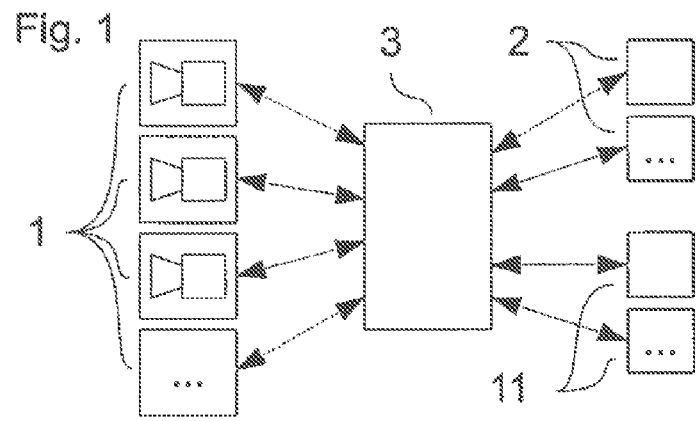
FIG. 1 is a schematic representation of a camera system according to the invention.
Figure 2:
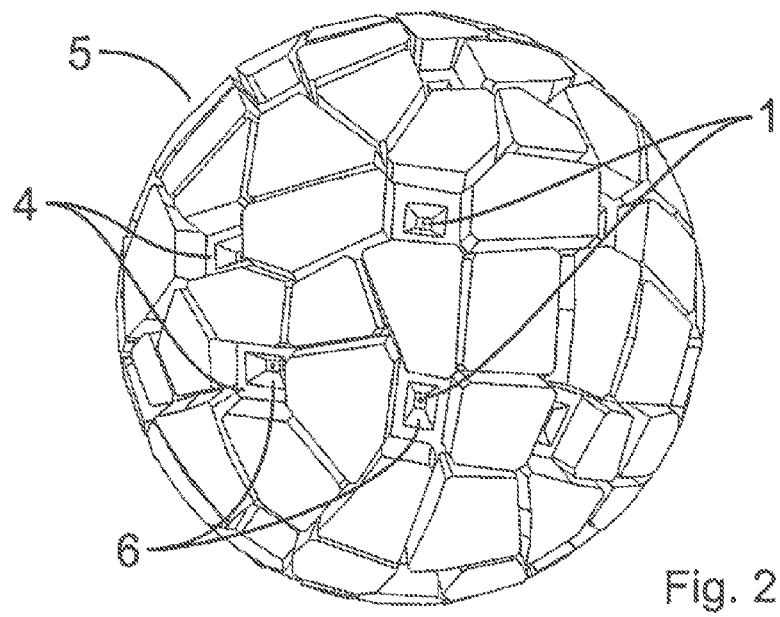
FIG. 2 is a perspective view of a camera system according to the invention.
Figure 3:
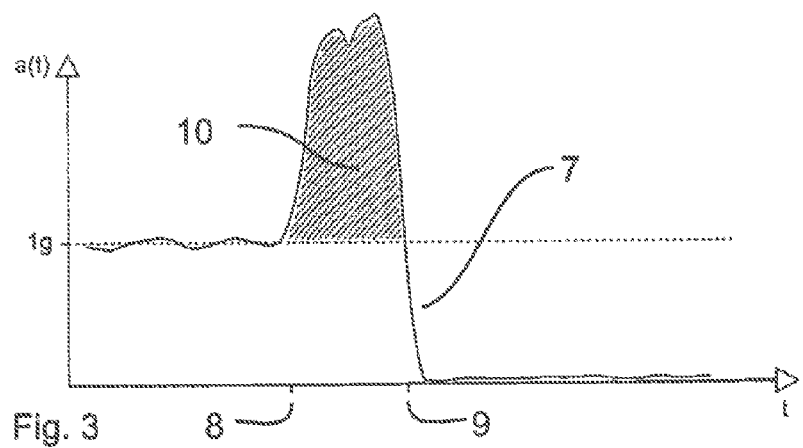
FIG. 3 is a schematic representation of the integration of the acceleration before the beginning of the free fall with air resistance.

The embodiment according to FIGS. 1, 2 and 3 represent a camera system for capturing full spherical panoramas, which is thrown into the air. It is called Throwable Panoramic Ball. Camera, and described below.

The camera system according to the invention consists of a spherical supporting structure 4, for example a ball, with 36 mobile phone camera modules 1 and the necessary electronics inside. The camera modules 1 are arranged on the surface of said spherical supporting structure 4 so as to cover the entire solid angle of 4 pi sr. That is, the camera modules 1 cover the entire solid angle with their view volume. The camera system is cast vertically into the air by the user and the camera system is given an acceleration 7 upon launch, which is detectable by an accelerometer 2 arranged in the camera system. After integrating the acceleration 7, and determining the velocity, the moment of reaching of the apex is determined. Upon reaching the apex the mobile phone camera modules 1 simultaneously each trigger an image capture.

This happens when the hall is moving very slowly. The images of the cameras are composed to a composite image according to existing methods for panoramic photography.

The construction of the camera can be further described as follows. The camera system comprises 36 mobile phone camera modules 1 each buffering image data after capturing in a First-In-First-Out RAM IC (FIFO RAM-IC). The mobile phone camera modules 1 and the FIFO-RAM-ICs are mounted on small circuit boards below the surface of the ball to a supporting structure 4. A motherboard with a central microcontroller and other components that make up the control unit 3 is located inside the supporting structure 4. The mobile phone camera modules 1 are connected via a bus to the central microcontroller. This transfers the image data via a connected USB cable to a PC after the flight.

The flight of the camera system can be divided into four phases: 1. Rest, 2. Launch, 3 Flight, 4 Collection. In phase 1, the sensor 2 measures only acceleration of gravity, while in phase 2, the acceleration due to gravity plus the bunch acceleration 7 is measured by sensor 2. The beginning of the launch phase 8 and the end of the launch phase 9 is shown in FIG. 3. During Phase 3, i.e. the flight phase, no or only a very little acceleration is measured by sensor 2, because the sensor's test mass descends (and ascends) as fast as the camera system. In phase 4, inertia by capture adds to the acceleration of gravity.

Since the measured acceleration 7 during the flight at the end of the launch phase 9 is approximately 0 m/s$^2$, the apex is best determined indirectly through the launch velocity. Therefore, the microcontroller constantly caches the last n acceleration values in a first-in-first-out (FIFO) buffer. The flight phase is reached when the measured acceleration falls below the threshold value of 0.3 g for 100 ms.

To determine the launch phase, the FIFO is accessed in reverse order. In this case, the end of the launch phase 9 is detected first as soon as the acceleration increases to a value over 1.3 g. Then, the FIFO is read further in reverse until the acceleration 7 drops below 1.2 g. The launch velocity can now be determined by integrating the acceleration 7 between these two time points in the FIFO, wherein the acceleration by gravity is subtracted. The integrated surface 10 is shown in FIG. 3. The ascending time to the apex is calculated directly from the velocity while taking into account air resistance.

The mobile phone camera modules 1 are triggered by a timer in the microcontroller of the control unit 3, which starts upon detection of free fall with air resistance after the ascending phase. The individual trigger delays of the mobile phone camera modules 1 are considered and subtracted from the ascending phase as correction factors. Furthermore, 100 ms are subtracted after which the free fail is detected as described above.

For the camera system according to the invention, a module which is as small as possible of a mobile phone camera is used as a mobile phone camera module 1 with fixed focus. In this type of lens, the entire scene is captured sharply above a certain distance and does not require time for focusing. Most mobile phone cameras have relatively low opening angles, so that more mobile phone camera modules are required in total. However, this causes the recesses 6 on the surface and supporting structure 4 of the camera system to remain narrow. This makes unintended touching of the lenses when throwing less likely. Advantageously, in the camera system, the direct compression of the JPEG image data is managed by hardware. This allows that many images are cached in the FIFO and subsequent transfer to the PC is fast.

For enabling throwing the camera system, the spherical supporting structure 4 needs to be kept small. Therefore, it is necessary to minimize the number of mobile phone camera modules 1 to be arranged so that the entire solid angle is covered. This is why the position of the mobile camera modules 1 on the surface of the supporting structure 4 was optimized numerically. For this purpose, an optimization algorithm was implemented, which works on the principle of hill climbing with random restart and the result is subsequently improved by simulated annealing.

The virtual cameras are placed with their projection centers in the center of a unit sphere to cover a part of spherical surface by their view volumes. Thus, the coverage of the solid angle by the camera modules for a given combination of camera orientations can be evaluated by checking the uniformly distributed test points on the sphere surface. As cost function, the number of test points is used, which are not covered by a virtual camera. The algorithm minimizes this cost function.

To be able to practically implement the computed camera orientations, it is useful to manufacture the supporting structure 4 by rapid prototyping. The supporting structure 4 was manufactured by selective laser sintering of PA 2200 material.

Holes in the supporting structure 4 are provided for better air cooling of electronics. To this shell suspensions are mounted inside for attaching the circuit boards of the mobile phone camera modules 1. In addition, suspensions are available for the motherboard and the battery. The sphere is divided into two halves, which are joined together by screws. In addition to the holes for the camera lenses, gaps for the USB cable and the on/off switch are present. Points for attachment of ropes and rods are also provided. The suspension for the camera boards should allow accurate positioning of the mobile phone camera modules 1 at the calculated orientations. It is important that by throwing the camera system, no change in position occurs. To ensure this, arresters were mounted on two sides of the suspension and springs on each opposite sides. The springs were realized directly by the elastic material PA 2200.

In addition, a clip fastened on both sides with a hook pushes the circuit board toward the outside of the supporting structure 4. The arrest in this direction consists of several small protrusions positioned on free spots on the board. On this side there is also a channel that directs the light from an LED to the outside.

Every mobile phone camera module 1 is mounted behind a recess in the surface of the camera system. This recess is adapted to the shape of the view volume of the mobile phone camera module 1. It has therefore the shape of a truncated pyramid. In this recess positioned on one side is the outlet of the LED channel and on the other side, recessed during laser sintering, the number of mobile phone camera modules 1. When using the camera system, it is very difficult to touch camera lenses with fingers due to the shape and size of the recesses, protecting these from damage and dirt.

As a shock absorber in case of accidental dropping and to increase grip, foam is glued to the outside of the supporting structure 4, which forms a padding 5. A closed cell cross-linked polyethylene foam with a density of 33 kg/m$^3$ is applied, which is available commercially under the brand name "Plastazote® LD33".

FIG. 2 shows the exterior view of the camera system with padding 5, the supporting structure 4, the recesses 6 and the mobile phone camera modules 1.

Every mobile phone camera module 1 is positioned on a small board. All camera boards are connected by one long ribbon cable to the motherboard. This cable transfers both data to the motherboard via a parallel bus and the control commands via a serial bus to the camera boards. The mainboard provides each of the camera boards via power cables with required voltages.

The mainboard itself hosts the central microcontroller, a USB-IC, a bluetooth module, the power supply, the battery protection circuit, a microSD socket, an A/D converter, an accelerometer, and rotational rate sensors.

On the camera board located next to the VS6724 camera module is a AL460 FIFO IC for the temporary storage of data and a ATtiny24 microcontroller. The camera module is mounted in the center of a 19.2 mm×25.5 mm×1.6 mm size board on a base plate. This is exactly in the middle of the symmetrical board to simplify the orientation in the design of the supporting structure 4. The FIFO-IC is placed on the flip side, so that the total size of the board only insignificantly exceeds the dimensions of the FIFO-ICs. A microcontroller handles the communication with the motherboard and controls FIFO and camera.

NUMERAL LIST

1 Single cameras
2 Sensors
3 Control unit
4 Supporting structure
5 Padding
6 Recesses
7 Acceleration
8 Beginning of the launch phase
9 End of the launch phase
10 Integrated area
11 Actuatory components

The invention claimed is:

1. A method of capturing images using a camera system comprising at least two single cameras covering together a solid angle of 4 pi sr, a control unit and two or more sensors comprising an accelerometer and a rotation rate sensor, the method comprising:
propelling the camera system by an initial acceleration to a starting velocity;
triggering the camera system when the camera system falls short of a minimum distance of at most 5 cm from an apogee within a trajectory of the camera system, the triggering determined according to a predetermined objective function, the apogee determined by integrating acceleration of the camera system in time before entry into free fall with air resistance; capturing at least a single image by the two single cameras; and
further comprising defining a maximum motion blur and calculating a maximum rotational rate r using exposure time applied and triggering the at least two single cameras by comparing values of the rotation rate sensor to the maximum rotational rate r by the control unit.

2. A method of capturing images using a camera system comprising at least two single cameras covering together a solid angle of 4 pi sr, a control unit and two or more sensors comprising an accelerometer and a rotation rate sensor the method comprising:
propelling the camera system by an initial acceleration to a starting velocity; triggering the camera system when the camera system falls short of a minimum distance of at most 5 cm from an apogee within a trajectory of the camera system, the triggering determined according to a predetermined objective function, the apogee determined by integrating acceleration of the camera system in time before entry into free fall with air resistance; capturing a time series of images, each comprising at least a single image captured by the single cameras; and
further comprising defining a maximum motion blur and calculating a maximum rotational rate r using exposure time applied and triggering the at least two single cameras by comparing the values of the rotation rate sensor to the maximum rotational rate r by the control unit.

3. The method of capturing images using a camera system according to claim 2, further comprising evaluating and selecting an image by the control unit depending on the content of the images.

4. The method of capturing images using a camera system according to claim 2, further comprising evaluating and selecting an image by the control unit by the measured values of the sensors.

5. The method according to claim 3, comprising selecting the image from the time series of images by calculating the current position of the camera system from the images.

6. The method according to claim 3, comprising selecting the image from the time series of images by the sharpness of the images.

7. The method according to claim 3, comprising selecting the image from the time series of images by the size of compressed images.

8. The method according to claim 1, wherein the single cameras are synchronized with each other so that they all trigger at the same time.

9. The method according to claim 1, wherein the triggering of the single cameras does not occur when the maximum rotational rate r is exceeded.

10. The method according to claim 1, wherein upon exceeding the maximum rotation rate r, buffering images of a plurality of successive flights and selecting only one of the images by the control unit using an upper maximum rotation rate m and a rotation rate, wherein an upper maximum rotation rate m is calculated from a predetermined upper maximum motion blur and exposure time applied.

11. The method according to claim 1, comprising the central control unit acquiring exposure-related data from the sensors or arranged single cameras with the beginning of the flight, determining matching exposure settings for the single cameras and sending these to the single cameras and the single cameras at the trigger time using exposure settings from the control unit instead of local settings for single image capture.

12. The method according to claim 1, comprising the central control unit acquiring focusing-related data from the sensors or arranged single cameras with the beginning of the flight, determining matching focusing settings for the single cameras and sending these to the single cameras and the single cameras at the trigger time using focus settings from the control unit instead of local settings for single image capture.

13. The method according to claim 1, comprising the central control unit before the beginning of the flight determining the direction of the gravity vector relative to the camera using an orientation sensor, determining the orientation change between the time of this measurement and the trigger point, and determining the gravity vector at the moment of triggering using the gravity vector determined before the beginning of the flight and the change in orientation.

14. The method according to claim 2, wherein the triggering of the single cameras does not occur when the rotational rate r is exceeded.

15. The method according to claim 2, wherein upon exceeding the rotation rate r, buffering images of a plurality of successive flights and selecting only one of the images by the control unit using an upper maximum rotation rate m and a rotation rate, wherein a maximum rotation rate m is calculated from a predetermined upper maximum motion blur and an exposure time applied.

16. The method according to claim 2, comprising the central control unit before the beginning of the flight determining the direction of the gravity vector relative to the camera using an orientation sensor, determining the orientation change between the time of this measurement and the trigger point, and determining the gravity vector at the moment of triggering using the gravity vector determined before the beginning of the flight and the change in orientation.

17. The method according to claim 2, comprising the central control unit acquiring exposure-related data from the sensors or arranged single cameras with the beginning of the flight, determining matching exposure settings for the single cameras and sending these to the single cameras and the single cameras at the trigger time using exposure settings from the control unit instead of local settings for single image capture.

18. The method according to claim 2, comprising the central control unit acquiring focusing-related data from the sensors or arranged single cameras with the beginning of the flight, determining matching focusing settings for the single cameras and sending these to the single cameras and the single cameras at the trigger time using focus settings from the control unit instead of local settings for single image capture.

* * * * *